(12) United States Patent
Sellers et al.

(10) Patent No.: US 11,348,041 B2
(45) Date of Patent: May 31, 2022

(54) SYSTEM FOR PREDICTIVE RESOURCE ACCESS WITHIN A TECHNICAL ENVIRONMENT

(71) Applicant: Bank of America Corporation, Charlotte, NC (US)

(72) Inventors: John Allen Sellers, Kennett Square, PA (US); Charles Jason Burrell, Middleburg, FL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 131 days.

(21) Appl. No.: 16/919,182

(22) Filed: Jul. 2, 2020

(65) Prior Publication Data
US 2022/0004940 A1 Jan. 6, 2022

(51) Int. Cl.
| | |
|---|---|
| *G06Q 10/04* | (2012.01) |
| *H04L 9/40* | (2022.01) |
| *G06Q 40/02* | (2012.01) |
| *G06Q 30/02* | (2012.01) |
| *G06N 20/00* | (2019.01) |
| *G06Q 10/06* | (2012.01) |
| *G06F 11/34* | (2006.01) |
| *G06F 11/30* | (2006.01) |
| *G06Q 30/00* | (2012.01) |

(52) U.S. Cl.
CPC ......... *G06Q 10/04* (2013.01); *G06F 11/3006* (2013.01); *G06F 11/3438* (2013.01); *G06N 20/00* (2019.01); *G06Q 10/06315* (2013.01); *G06Q 30/0185* (2013.01); *G06Q 30/0201* (2013.01); *G06Q 40/02* (2013.01); *H04L 63/102* (2013.01)

(58) Field of Classification Search
CPC combination set(s) only.
See application file for complete search history.

(56) References Cited

U.S. PATENT DOCUMENTS

| | | | |
|---|---|---|---|
| 5,537,314 A | 7/1996 | Kanter | |
| 5,583,763 A | 12/1996 | Atcheson et al. | |
| 5,684,963 A | 11/1997 | Clement | |
| 5,699,528 A | 12/1997 | Hogan | |
| 5,765,144 A | 6/1998 | Larche et al. | |
| 5,768,142 A | 6/1998 | Jacobs | |

(Continued)

*Primary Examiner* — Arif Ullah
(74) *Attorney, Agent, or Firm* — Moore & Van Allen PLLC; Anup Shrinivasan Iyer

(57) ABSTRACT

Systems, computer program products, and methods are described herein for predictive resource access within a technical environment. The present invention is configured to initiate a resource monitoring engine on a resource procurement profile associated with a user; receive information associated with one or more resources accessed by the user over a predetermined past period of time; receive information associated with one or more user characteristics associated with the user; initiate one or more machine learning algorithms on the one or more resources and the information associated with one or more user characteristics; generate, using the one or more machine learning algorithms, a forecasting model configured to predict one or more future resources accessible to the user at a predetermined future time; and initiate a resource transformation engine on the one or more future resources predicted to be accessible to the user at the predetermined future time.

20 Claims, 2 Drawing Sheets

(56) References Cited

U.S. PATENT DOCUMENTS

| | | |
|---|---|---|
| 5,794,207 A | 8/1998 | Walker et al. |
| 5,802,502 A | 9/1998 | Gell et al. |
| 5,832,460 A | 11/1998 | Bednar et al. |
| 5,862,203 A | 1/1999 | Wulkan et al. |
| 5,897,621 A | 4/1999 | Boesch et al. |
| 5,963,910 A | 10/1999 | Ulwick |
| 5,987,434 A | 11/1999 | Libman |
| 6,029,195 A | 2/2000 | Herz |
| 6,058,380 A | 5/2000 | Anderson et al. |
| 6,070,150 A | 5/2000 | Remington et al. |
| 6,119,109 A | 9/2000 | Muratani et al. |
| 6,285,991 B1 | 9/2001 | Powar |
| 6,311,170 B1 | 10/2001 | Embrey |
| 6,968,319 B1 | 11/2005 | Remington et al. |
| 10,542,021 B1* | 1/2020 | Mehr .................. H04L 63/1425 |
| 2005/0229157 A1 | 10/2005 | Johnson |
| 2013/0080641 A1* | 3/2013 | Lui ....................... H04L 43/045 709/226 |
| 2018/0276553 A1* | 9/2018 | Redkar .................. G06N 20/00 |

\* cited by examiner

SYSTEM FOR PREDICTIVE RESOURCE ACCESS WITHIN A TECHNICAL ENVIRONMENT

FIELD OF THE INVENTION

The present invention embraces a system for predictive resource access within a technical environment.

BACKGROUND

Predictive analytics is an application of artificial intelligence that can be used by entities to optimize their processes while reducing cost and increasing efficiency of resource distribution and access.

There is a need for a system for predictive resource access within a technical environment.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for predictive resource access within a technical environment is presented. The system comprising: at least one non-transitory storage device; and at least one processing device coupled to the at least one non-transitory storage device, wherein the at least one processing device is configured to: initiate a resource monitoring engine on a resource procurement profile associated with a user; electronically receive, using the resource monitoring engine, information associated with one or more resources accessed by the user over a predetermined past period of time; electronically receive information associated with one or more user characteristics associated with the user; initiate one or more machine learning algorithms on the one or more resources and the information associated with one or more user characteristics; generate, using the one or more machine learning algorithms, a forecasting model configured to predict one or more future resources accessible to the user at a predetermined future time; initiate a resource transformation engine on the one or more future resources predicted to be accessible to the user at the predetermined future time; transform, using the resource transformation engine, the one or more future resources predicted to be accessible to the user at the predetermined future time into one or more alternate resources, wherein the one or more alternate resources are immediately accessible to the user; and transmit control signals configured to cause a computing device of the user to display the one or more alternate resources immediately accessible to the user.

In some embodiments, the at least one processing device is further configured to: electronically receive, using the resource monitoring engine, the information associated with the one or more resources, wherein the information associated with the one or more resources comprises at least a resource type.

In some embodiments, the at least one processing device is further configured to: electronically receive information associated with the one or more user characteristics associated with the user, wherein the one or more user characteristics comprises at least one or more past resource transfers executed by the user, a geographic location of the user, a period amount of incoming funds, a periodic amount of outgoing funds, spending behavior, and/or saving behavior.

In some embodiments, the at least one processing device is further configured to: determine a user authorization profile associated with the user, wherein the user authorization profile comprises at least one or more predetermined authorization profiles; and initiate the one or more machine learning algorithms on the one or more resources, the information associated with one or more user characteristics, and the user authorization profile.

In some embodiments, the at least one processing device is further configured to: electronically receive, via the computing device of the user, one or more authorization attributes associated with the user; compare the one or more authorization attributes with the one or more predetermined authorization profiles to determine a match; and determine the user authorization profile based on at least determining the match.

In some embodiments, the one or more authorization attributes comprises at least a punctuality associated with past resource transfers executed by the user, an amount of resource obligation, a type of resource obligation, a number of resource procurement profiles associated with the user, and/or a longevity of a relationship of the user with one or more entities associated with the resource procurement profiles.

In some embodiments, the at least one processing device is further configured to: initiate the one or more machine learning algorithms, wherein the one or more machine learning algorithms comprises at least one or more forecasting algorithms.

In some embodiments, the at least one processing device is further configured to: determine that the one or more future resources are associated with a first resource type, wherein the first resource type is not immediately accessible to the user; and initiate the resource transformation engine on the one or more future resources, wherein the resource transformation engine is configured to convert the one or more future resources from a first resource type to a second resource type, wherein the second resource type is immediately accessible to the user.

In another aspect, a computer program product for predictive resource access within a technical environment is presented. The computer program product comprising a non-transitory computer-readable medium comprising code causing a first apparatus to: initiate a resource monitoring engine on a resource procurement profile associated with a user; electronically receive, using the resource monitoring engine, information associated with one or more resources accessed by the user over a predetermined past period of time; electronically receive information associated with one or more user characteristics associated with the user; initiate one or more machine learning algorithms on the one or more resources and the information associated with one or more user characteristics; generate, using the one or more machine learning algorithms, a forecasting model configured to predict one or more future resources accessible to the user at a predetermined future time; initiate a resource transformation engine on the one or more future resources predicted to be accessible to the user at the predetermined future time; transform, using the resource transformation engine, the one or more future resources predicted to be accessible to the user at the predetermined future time into one or more alternate resources, wherein the one or more alternate resources are immediately accessible to the user; and transmit control signals configured to cause a computing device of the user to display the one or more alternate resources immediately accessible to the user.

In yet another aspect, a method for predictive resource access within a technical environment is presented. The method comprising: initiating a resource monitoring engine on a resource procurement profile associated with a user; electronically receiving, using the resource monitoring engine, information associated with one or more resources accessed by the user over a predetermined past period of time; electronically receiving information associated with one or more user characteristics associated with the user; initiating one or more machine learning algorithms on the one or more resources and the information associated with one or more user characteristics; generating, using the one or more machine learning algorithms, a forecasting model configured to predict one or more future resources accessible to the user at a predetermined future time; initiating a resource transformation engine on the one or more future resources predicted to be accessible to the user at the predetermined future time; transforming, using the resource transformation engine, the one or more future resources predicted to be accessible to the user at the predetermined future time into one or more alternate resources, wherein the one or more alternate resources are immediately accessible to the user; and transmitting control signals configured to cause a computing device of the user to display the one or more alternate resources immediately accessible to the user.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
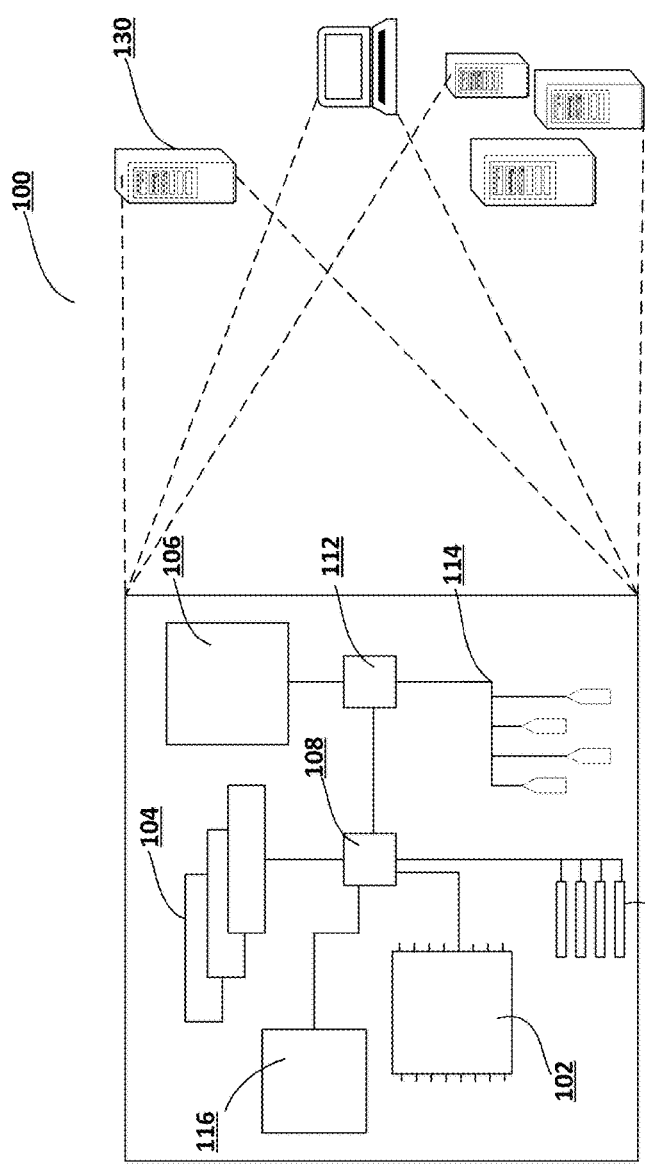
Figure 1:
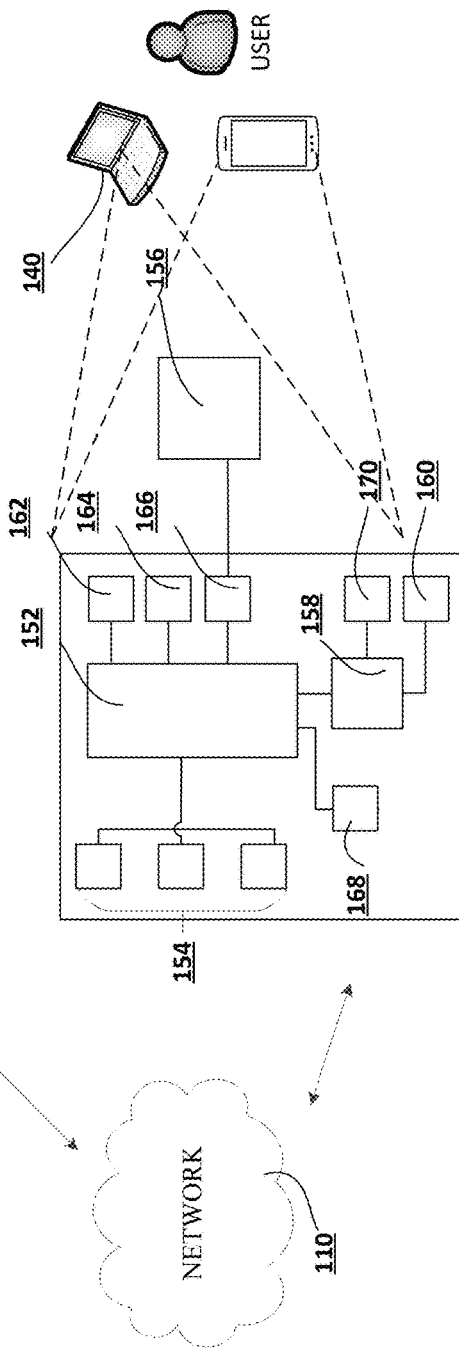
Figure 2:
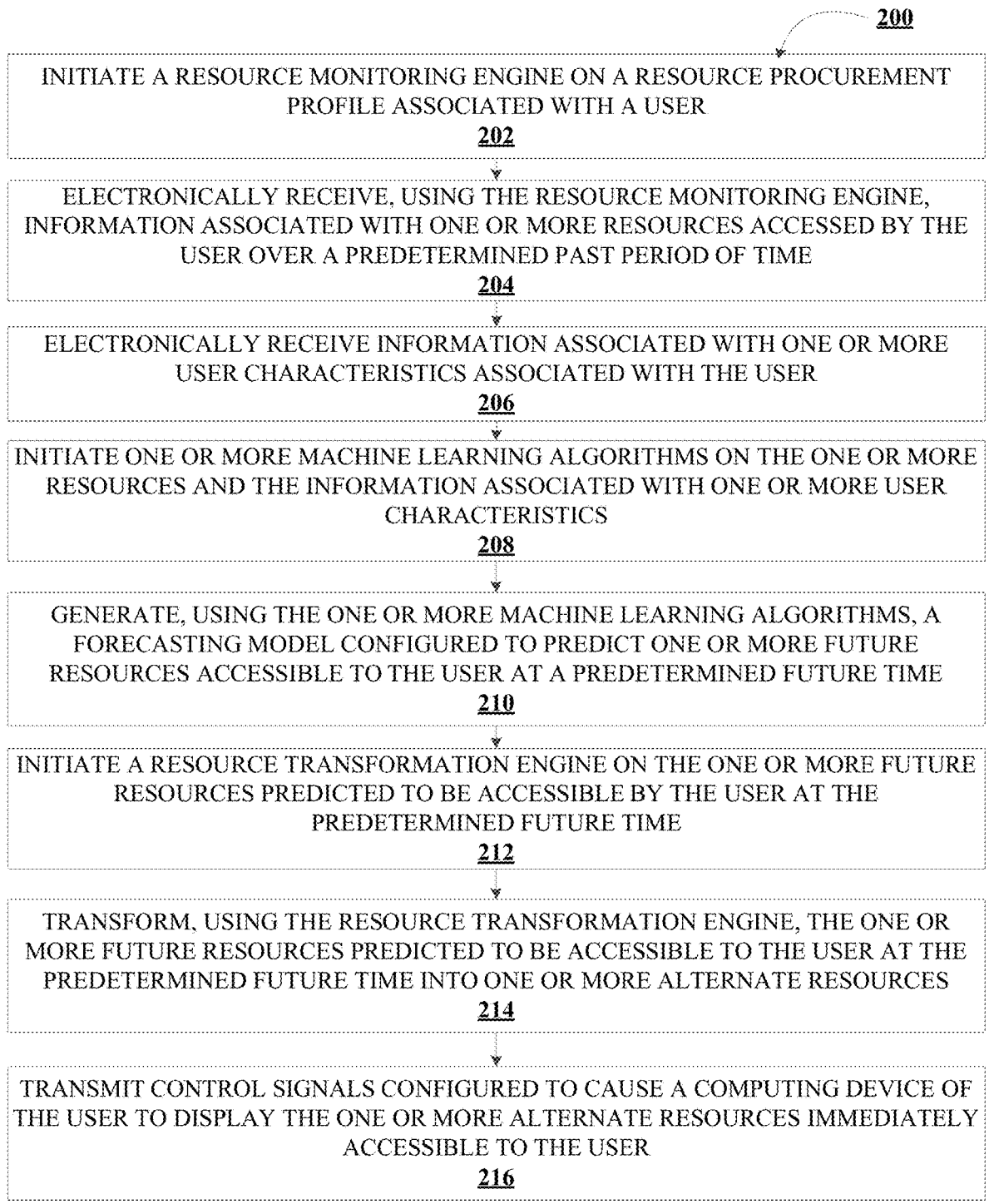

Having thus described embodiments of the invention in general terms, reference will now be made the accompanying drawings, wherein:

FIG. 1 illustrates technical components of a system for predictive resource access within a technical environment, in accordance with an embodiment of the invention; and FIG. 2 illustrates a process flow for predictive resource access within a technical environment, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, a "resource" may generally refer to objects, products, devices, goods, commodities, services, rewards, offers, discounts, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like.

As used herein, a "resource transfer" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. In the context of an entity such as a financial institution, a resource transfer may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that invokes or is detectable by the financial institution. In some embodiments, the user may authorize a resource transfer using at least a payment instrument (credit cards, debit cards, checks, digital wallets, currency, loyalty points), and/or payment credentials (account numbers, payment instrument identifiers). A resource transfer may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. In this regard, resource transfers or transactions may refer to the user initiating a purchase for a product, service, or the like from a merchant. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application. In accordance with embodiments of the invention, the term "module" with respect to an apparatus may refer to a hardware component of the apparatus, a software component of the apparatus, or a component of the apparatus that comprises both hardware and software. In accordance with embodiments of the invention, the term "chip" may refer to an integrated circuit, a microprocessor, a system-on-a-chip, a microcontroller, or the like that may either be integrated into the external apparatus or may be inserted and removed from the external apparatus by a user.

As used herein, "authentication credentials" may be any information that can be used to identify of a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

FIG. 1 presents an exemplary block diagram of the system environment for predictive resource access within a technical environment 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute resource transfers using one or more applications stored thereon. The one or more applications may be configured to communicate with the system 130, execute a transaction, input information onto a user interface presented on the user input system 140, or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, workstations, personal digital assistants, servers, blade servers, mainframes, and other appropriate computers. The user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application, and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation- and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

FIG. 2 illustrates a process flow for predictive resource access within a technical environment 200, in accordance with an embodiment of the invention. As shown in block 202, the process flow includes initiating a resource monitoring engine on a resource procurement profile associated with a user.

Next, as shown in block 204, the process flow includes electronically receiving, using the resource monitoring engine, information associated with one or more resources accessed by the user over a predetermined past period of time. In some embodiments, the resources accessed by the user over the predetermined past period of time continue to remain available and accessible to the user. As described herein, the resources may be associated with one or more financial products and/or services used by the user. In one example, the resources may be rewards funds accrued by the user in using a payment instrument associated with the entity. In some embodiments, the information associated with the resources may include a resource type. Following from the previous example, if the resources accessed by the user is rewards funds accrued over the predetermined past period of time, the resource type may indicate the type of rewards funds accessed by the user, such as, credit card rewards, loyalty points, airline miles, discounts, offers, and/or the like.

Next, as shown in block 206, the process flow includes electronically receiving information associated with one or more user characteristics associated with the user. In some embodiments, the one or more user characteristics may include at least one or more past resource transfers executed by the user, a geographic location of the user, a period amount of incoming funds, a periodic amount of outgoing funds, spending behavior, saving behavior, and/or the like.

In some embodiments, the user characteristics may include a user authorization profile. In one aspect, an authorization profile may refer to profiles created for specific users based on user authorization attributes. In one aspect, the one or more authorization attributes may include, at least a punctuality associated with past resource transfers executed by the user, an amount of resource obligation, a type of resource obligation, a number of resource procurement profiles associated with the user, and/or a longevity of a relationship of the user with one or more entities associated with the resource procurement profiles. Accordingly, the system may be configured to electronically receive, via the computing device of the user, one or more authorization attributes associated with the user. In response to receiving the one or more authorization attributes, the system may be configured to compare the one or more authorization attributes with the one or more predetermined authorization profiles to determine a match. In response, the system may be configured to determine the user authorization profile based on at least determining the match.

In some embodiments, the user authorization profile may dictate the resources (e.g., future resources) that may be available and/or accessible to the user. Accordingly, when the user wishes to access a resource located within a distributed network of servers, the system may be configured to retrieve the authorization profile of the user and compare the authorization profile with pre-configured rules specific to the distributed network of servers to determine whether the one or more authorization attributes associated with the authorization profile of the user meets the requirements of the pre-configured rules. Based on the comparison, the system may be configured to determine that the one or more authorization attributes associated with the authorization profile of the user meets the requirements of the pre-configured rules. If so, the system may be configured to enable the user to access the resource within the distributed network of servers.

Next, as shown in block 208, the process flow includes initiating one or more machine learning algorithms on the one or more resources and the information associated with one or more user characteristics. In some embodiments, the system may be configured to implement any of the following applicable machine learning algorithms either singly or in combination: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in generating data relevant to the system 130. In some embodiments, the one or more machine learning algorithms may be predictive modeling algorithms configured to use data and statistics to predict outcomes with forecasting models.

Next, as shown in block 210, the process flow includes generating, using the one or more machine learning algorithms, a forecasting model configured to predict one or more future resources accessible to the user at a predetermined future time. In some embodiments, the forecasting model may be generated by training on the information associated with one or more resources accessed by the user over a predetermined past period of time and information associated with the one or more user characteristics, including the user authorization profile. In doing so, the system may be configured to determine which of the future resources will be available to the user, and which of those available future resources will be accessible for the user. For example, the forecasting model may predict that only a subset of financial products and/or services may be available to the user. In some other embodiments, the system may be configured to determine that all the future resources will be available to the user, but determine which of those future resources will be accessible for the user. For example, the forecasting model may predict that all the financial products and/or services are available to the user, but the user is eligible to access only a subset of the financial products and/or services at the predetermined future time. It is possible that in time, the number of financial products and/or services are accessible for the user will increase. In some embodiments, the one or more machine learning algorithms may be used to calculate the probability that the one or more future resources will be available for the user, and the probability that a particular future resource will be available to the user and the probability that the user will be capable of accessing them at the predetermined future time.

In some embodiments, the one or more future resources that are determined to be available and accessible for the user at the predetermined future time are resources having pre-configured rules whose requirements are still met by the existing authorization profile of the user. In some other embodiments, the one or more future resources that are determined to be available and/or accessible for the user at the predetermined future time are resources having pre-configured rules whose requirements are not met by the existing authorization profile of the user. In such cases, the system may be configured to predict, using the forecasting model, one or more additional authorization attributes that the user will have to acquire to meet the pre-configured rules associated with the future resources to make the future resources available and/or accessible for the user at the predetermined future date.

Next, as shown in block 212, the process flow includes initiating a resource transformation engine on the one or more future resources predicted to be accessible to the user at the predetermined future time. In some embodiments, the system may be configured to determine that the one or more future resources are not immediately accessible to the user (it remains accessible at the predetermined future date). In response, the system may be configured to initiate the resource transformation engine on the one or more future resources to transform the one or more future resources to enable the one or more future resources to become immediately accessible to the user.

Next, as shown in block 214, the process flow includes transforming, using the resource transformation engine, the one or more future resources predicted to be accessible to the user at the predetermined future time into one or more alternate resources. In one aspect, the one or more alternate resources are immediately accessible to the user. For example, assume that the one or more future resources are rewards funds the user is predicted to have accrued at the predetermined future time based on the amount of rewards funds the user has accrued in the past. These rewards funds may be transformed into an alternate resource such as a loan capable of being accessed by the user for immediate use, and available to be paid off by the rewards funds that are predicted for the user to accrue until the predetermined future date.

In some embodiments, the system may be configured to determine that the one or more future resources are associated with a first resource type that is not immediately accessible to the user. In response, the system may be configured to initiate the resource transformation engine on the one or more future resources associated with the first resource type, to be transformed into a second resource type that is immediately accessible to the user. Following from the previous example, assume that the amount of rewards funds the user is predicted to have accrued at the predetermined future time is based on credit card usage (first resource type). These rewards funds may be transformed into an amount of funds that can be applied towards a specific merchant available immediately for the user (second resource type).

In some embodiments, the system may be configured to determine that while the authorization profile of the user will likely advance to a point at the predetermined future date to meet the requirements of accessibility of the future resources, the current authorization profile of the user does not meet the requirements. Accordingly, the system may be configured to determine the alternate resources that may be a portion of the one or more future resources that are capable of being accessed by the user immediately based on the user's current authorization profile.

Next, as shown in block 216, the process flow includes transmitting control signals configured to cause a computing device of the user to display the one or more alternate resources immediately accessible to the user. In this regard, the system may be configured to initiate a presentation of a user interface configured to display the one or more alternate resources to the user. In response, the user may select at least one of the one or more alternate resources for access.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for predictive resource access within a technical environment, the system comprising:
at least one non-transitory storage device; and
at least one processing device coupled to the at least one non-transitory storage device, wherein the at least one processing device is configured to:
initiate a resource monitoring engine on a resource procurement profile associated with a user;
electronically receive, using the resource monitoring engine, information associated with one or more resources accessed by the user over a predetermined past period of time;
electronically receive information associated with one or more user characteristics associated with the user and one or more authorization attributes associated with the user;
initiate one or more machine learning algorithms on the one or more resources and the information associated with one or more user characteristics;
generate, using the one or more machine learning algorithms, a forecasting model configured to predict one or more future resources accessible to the user at a predetermined future time;
determine that the one or more future resources are located within a distributed network of servers, wherein the distributed network of servers are associated with one or more pre-configured access rules;
determine that the one or more authorization attributes meets the one or more pre-configured access rules associated with the distributed network of servers;
determine that the user is authorized to access the one or more future resources based on at least determining that the one or more authorization attributes meets the one or more pre-configured access rules associated with the distributed network of servers;
determine that the one or more future resources are not immediately accessible to the user and are only accessible at the predetermined future time;
initiate a resource transformation engine on the one or more future resources;
transform, using the resource transformation engine, the one or more future resources predicted to be accessible to the user at the predetermined future time into one or more alternate resources, wherein the one or more alternate resources are immediately accessible to the user; and
transmit control signals configured to cause a computing device of the user to display the one or more alternate resources immediately accessible to the user.

2. The system of claim 1, wherein the at least one processing device is further configured to:
electronically receive, using the resource monitoring engine, the information associated with the one or more resources, wherein the information associated with the one or more resources comprises at least a resource type.

3. The system of claim 1, wherein the at least one processing device is further configured to:
electronically receive information associated with the one or more user characteristics associated with the user, wherein the one or more user characteristics comprises at least one or more past resource transfers executed by the user, a geographic location of the user, a period amount of incoming funds, a periodic amount of outgoing funds, spending behavior, and/or saving behavior.

4. The system of claim 1, wherein the at least one processing device is further configured to:
determine a user authorization profile associated with the user, wherein the user authorization profile comprises at least one or more predetermined authorization profiles; and
initiate the one or more machine learning algorithms on the one or more resources, the information associated with one or more user characteristics, and the user authorization profile.

5. The system of claim 4, wherein the at least one processing device is further configured to:
electronically receive, via the computing device of the user, the one or more authorization attributes associated with the user;
compare the one or more authorization attributes with the one or more predetermined authorization profiles to determine a match; and
determine the user authorization profile based on at least determining the match.

6. The system of claim 5, wherein the one or more authorization attributes comprises at least a punctuality associated with past resource transfers executed by the user, an amount of resource obligation, a type of resource obligation, a number of resource procurement profiles associated with the user, and/or a longevity of a relationship of the user with one or more entities associated with the resource procurement profiles.

7. The system of claim 1, wherein the at least one processing device is further configured to:
initiate the one or more machine learning algorithms, wherein the one or more machine learning algorithms comprises at least one or more forecasting algorithms.

8. The system of claim 1, wherein the at least one processing device is further configured to:
determine that the one or more future resources are associated with a first resource type, wherein the first resource type is not immediately accessible to the user; and
initiate the resource transformation engine on the one or more future resources, wherein the resource transformation engine is configured to convert the one or more future resources from a first resource type to a second resource type, wherein the second resource type is immediately accessible to the user.

9. A computer program product for predictive resource access within a technical environment, the computer program product comprising a non-transitory computer-readable medium comprising code causing a first apparatus to:

initiate a resource monitoring engine on a resource procurement profile associated with a user;

electronically receive, using the resource monitoring engine, information associated with one or more resources accessed by the user over a predetermined past period of time;

electronically receive information associated with one or more user characteristics associated with the user and one or more authorization attributes associated with the user;

initiate one or more machine learning algorithms on the one or more resources and the information associated with one or more user characteristics;

generate, using the one or more machine learning algorithms, a forecasting model configured to predict one or more future resources accessible to the user at a predetermined future time;

determine that the one or more future resources are located within a distributed network of servers, wherein the distributed network of servers are associated with one or more pre-configured access rules;

determine that the one or more authorization attributes meets the one or more pre-configured access rules associated with the distributed network of servers;

determine that the user is authorized to access the one or more future resources based on at least determining that the one or more authorization attributes meets the one or more pre-configured access rules associated with the distributed network of servers;

determine that the one or more future resources are not immediately accessible to the user and are only accessible at the predetermined future time;

initiate a resource transformation engine on the one or more future resources;

transform, using the resource transformation engine, the one or more future resources predicted to be accessible to the user at the predetermined future time into one or more alternate resources, wherein the one or more alternate resources are immediately accessible to the user; and transmit control signals configured to cause a computing device of the user to display the one or more alternate resources immediately accessible to the user.

10. The computer program product of claim 9, wherein the first apparatus is further configured to:

electronically receive, using the resource monitoring engine, the information associated with the one or more resources, wherein the information associated with the one or more resources comprises at least a resource type.

11. The computer program product of claim 9, wherein the first apparatus is further configured to:

electronically receive information associated with the one or more user characteristics associated with the user, wherein the one or more user characteristics comprises at least one or more past resource transfers executed by the user, a geographic location of the user, a period amount of incoming funds, a periodic amount of outgoing funds, spending behavior, and/or saving behavior.

12. The computer program product of claim 9, wherein the first apparatus is further configured to:

determine a user authorization profile associated with the user, wherein the user authorization profile comprises at least one or more predetermined authorization profiles; and initiate the one or more machine learning algorithms on the one or more resources, the information associated with one or more user characteristics, and the user authorization profile.

13. The computer program product of claim 12, wherein the first apparatus is further configured to:

electronically receive, via the computing device of the user, the one or more authorization attributes associated with the user;

compare the one or more authorization attributes with the one or more predetermined authorization profiles to determine a match; and determine the user authorization profile based on at least determining the match.

14. The computer program product of claim 13, wherein the one or more authorization attributes comprises at least a punctuality associated with past resource transfers executed by the user, an amount of resource obligation, a type of resource obligation, a number of resource procurement profiles associated with the user, and/or a longevity of a relationship of the user with one or more entities associated with the resource procurement profiles.

15. The computer program product of claim 9, wherein the first apparatus is further configured to:

initiate the one or more machine learning algorithms, wherein the one or more machine learning algorithms comprises at least one or more forecasting algorithms.

16. The computer program product of claim 9, wherein the first apparatus is further configured to:

determine that the one or more future resources are associated with a first resource type, wherein the first resource type is not immediately accessible to the user; and initiate the resource transformation engine on the one or more future resources, wherein the resource transformation engine is configured to convert the one or more future resources from a first resource type to a second resource type, wherein the second resource type is immediately accessible to the user.

17. A method for predictive resource access within a technical environment, the method comprising:

initiating a resource monitoring engine on a resource procurement profile associated with a user;

electronically receiving, using the resource monitoring engine, information associated with one or more resources accessed by the user over a predetermined past period of time;

electronically receiving information associated with one or more user characteristics associated with the user and one or more authorization attributes associated with the user;

initiating one or more machine learning algorithms on the one or more resources and the information associated with one or more user characteristics;

generating, using the one or more machine learning algorithms, a forecasting model configured to predict one or more future resources accessible to the user at a predetermined future time;

determining that the one or more future resources are located within a distributed network of servers, wherein the distributed network of servers are associated with one or more pre-configured access rules;

determining that the one or more authorization attributes meets the one or more pre-configured access rules associated with the distributed network of servers;

determining that the user is authorized to access the one or more future resources based on at least determining that the one or more authorization attributes meets the one or more pre-configured access rules associated with the distributed network of servers;

determining that the one or more future resources are not immediately accessible to the user and are only accessible at the predetermined future time;

initiating a resource transformation engine on the one or more future resources;

transforming, using the resource transformation engine, the one or more future resources predicted to be accessible to the user at the predetermined future time into one or more alternate resources, wherein the one or more alternate resources are immediately accessible to the user; and transmitting control signals configured to cause a computing device of the user to display the one or more alternate resources immediately accessible to the user.

18. The method of claim 17, wherein the method further comprises:

electronically receiving, using the resource monitoring engine, the information associated with the one or more resources, wherein the information associated with the one or more resources comprises at least a resource type.

19. The method of claim 17, wherein the method further comprises:

electronically receiving information associated with the one or more user characteristics associated with the user, wherein the one or more user characteristics comprises at least one or more past resource transfers executed by the user, a geographic location of the user, a period amount of incoming funds, a periodic amount of outgoing funds, spending behavior, and/or saving behavior.

20. The method of claim 17, wherein the method further comprises:

determining a user authorization profile associated with the user, wherein the user authorization profile comprises at least one or more predetermined authorization profiles; and initiating the one or more machine learning algorithms on the one or more resources, the information associated with one or more user characteristics, and the user authorization profile.

\* \* \* \* \*